United States Patent Office 3,551,412
Patented Dec. 29, 1970

---

3,551,412
5-SUBSTITUTED BENZODIAZEPINES
Josef Schmitt, L'Hay-les-Roses, Val de Marne, France, assignor to Etablissements Clin-Byla, Paris, France, a company of France
No Drawing. Continuation-in-part of application Ser. No. 517,434, Dec. 29, 1965. This application Oct. 29, 1968, Ser. No. 773,368
Claims priority, application France, Aug. 8, 1967, 117,190
The portion of the term of the patent subsequent to Feb. 4, 1986, has been disclaimed
Int. Cl. C07d 53/06
U.S. Cl. 260—239.3          21 Claims

ABSTRACT OF THE DISCLOSURE

Pharmacologically valuable benzodiazepines having the formula:

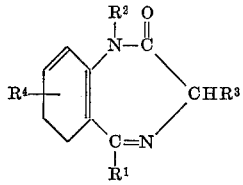

in which $R^1$ is phenyl, lower α-alkenyl, α-cycloalkenyl or is a group of the formula

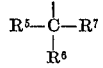

in which each of $R^5$ and $R^6$ is hydrogen, chlorine or lower alkyl or $R^5$ and $R^6$ taken together with the carbon atom to which they are attached represent cycloalkyl and $R^7$ is hydrogen or chlorine, $R^2$ is hydrogen, chlorine or lower alkyl subject to at least one of $R^2$, $R^5$, $R^6$ and $R^7$ being chlorine or $R^2$ being chlorine when $R^1$ is phenyl; $R^3$ is hydrogen or lower alkyl; and $R^4$ is hydrogen, halogen, lower alkyl, lower alkoxy, trifluoro methyl or nitro. The compounds have sedative and hypnotic properties.

---

This application is a continuation-in-part of my copending application Ser. No. 517,434, filed Dec. 29, 1965, now U.S. Pat. No. 3,426,014 and Ser. No. 748,189, filed July 29, 1968, now abandoned.

This invention relates to compounds of the benzodiazepine series and to the production thereof.

The present invention provides a 5-substituted benzodiazepine having the formula

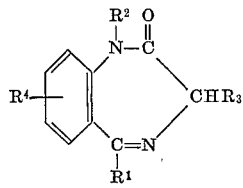

in which $R^1$ is selected from the group consisting of phenyl, lower α-alkenyl, α-cycloalkenyl having 5–6 carbon atoms, and a group having the formula

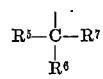

in which $R^5$ and $R^6$ are individually selected from the group consisting of hydrogen, chlorine and lower alkyl or $R^5$ and $R^6$ collectively with the carbon atom to which they are attached represent cycloalkyl having 5–6 carbon atoms and $R^7$ is selected from the group consisting of hydrogen and chlorine; $R^2$ is selected from the group consisting of hydrogen, chlorine and lower alkyl with the provisos (a) that at least one of $R^2$, $R^5$, $R^6$ and $R^7$ is chlorine and (b) that $R^2$ is chlorine when $R^1$ is phenyl; $R^3$ is selected from the group consisting of hydrogen and lower alkyl; and $R^4$ is selected from the group consisting of hydrogen, halogen, lower alkyl, lower alkoxy, trifluoromethyl and nitro.

The present invention stems from the discovery that when a benzodiazepine having the general formula

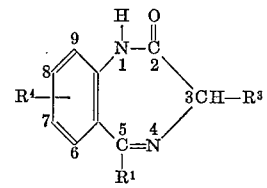

(I)

in which $R^1$, $R^3$ and $R^4$ are as above defined is treated with a metal or organic hypochlorite under conditions to be discussed, a product is obtained in which the hydrogen atom attached to the nitrogen atom in position 1 is replaced by a mobile chlorine atom. The chlorine atom undergoes rearrangement by an intramolecular radical reaction on to the carbon atom which, in the group $R^1$, is adjacent to the heterocycle provided this carbon atom carries at least one hydrogen atom. This rearrangement is impossible in the case in which $R^1$ is a phenyl group; in that case, however, the N-chloro derivative is more stable.

If two hydrogen atoms are attached to the carbon atom of the group $R^1$ which is directly linked to the carbon atom in the 5-position in the diazepine ring, as may be the case when $R^1$ is an alkyl group, substitution and rearrangement can be repeated, thus producing dichloroalkyl derivatives having both chlorine atoms attached to the same carbon atom. Lastly, if $R^1$ is a methyl group, it is possible by repeating this process a third time to prepare the 5-trichloromethyl derivative.

The chlorination may be carried out either with the aid of a metal hypochlorite such as sodium hypochlorite in a two-phase system comprising water and an organic solvent such as methylene chloride or using an organic hypochlorite such as tertiary-butyl hypochlorite in a homogeneous medium obtained with a suitable solvent such as methylene chloride.

If it is desired to isolate the N-chloro derivative, it is preferable to use the first method and to work at room temperature. When the operation is terminated, the organic layer is separated, the solvent is evaporated without exceeding a temperature of 30 to 35° C. and the residue is crystallised from a suitable solvent such as a hydrocarbon or an ether, care being taken to heat as little as possible.

Rearrangement of the chlorine atom is easily brought about by heating a solution of an N-chloro derivative in a solvent other than a primary or secondary alcohol such as di-isopropyl ether, ethyl acetate or tertiary-butyl alcohol under reflux for a time varying from a few minutes to several hours. The progress of the reaction can be followed by means of a test made with a solution of sodium iodide in acetone; under these conditions, the N-chloro derivatives liberate iodine from the iodide, thereby giving rise to a brown colour in the acetone solution, whilst the derivatives in which the position of chlorine has changed do not produce such coloration.

If the reagent used is tertiary-butyl hypochlorite dissolved in methylene chloride, it is difficult to isolate the N-chloro derivatives. A very considerable migration of the chlorine atom is frequently found to have taken place, depending upon the duration of the reaction. Advantage may be taken of this ease of rearrangement when it is desired to obtain mono-, di- or tri-chloro derivatives at the 5-position directly without intermediate isolation of any N-chloro derivative. To achieve this, all that is required is to use larger quantities of the hypochlorite and to increase the time of contact. In most cases, the desired compound precipitates from methylene chloride, the derivatives containing chlorine in the 5-position being generally less soluble in this solvent than the N-chloro compounds from which they are derived. In the case of the 5-trichloromethyl derivatives it is advantageous, in view of the relative difficulty in effecting rearrangement of the third chlorine atom, to complete the reaction by brief heating in solution in ethyl acetate.

The infrared spectra of the N-chloro compounds, determined in solution in methylene chloride (using a UNICAM SP 200 instrument), show, among other things, when compared with their precursors which have a hydrogen atom united to the nitrogen atom, an average hypsochromic displacement of the C=O band of 20 cm.$^{-1}$ (C=O 1680–1690 for the free N—H compounds and 1700–1710 for the N—Cl compounds). Moreover, the N-chloro compounds differ from their precursors by the absence of the N—H band which is present in the latter at 3400 cm.$^{-1}$. The monochloro compounds in which the chlorine has migrated to the 5-position have a C=O band at 1680–1690 cm.$^{-1}$ and an N—H band at 3400 cm.$^{-1}$. As for the dichloro and the trichloro compounds containing the chlorine in the 5-position, they have, inter alia, a C=O band at 1700 cm.$^{-1}$ and an N—H band at 3400 cm.$^{-1}$.

The N-chlorine atom in the N-chloro compounds can easily be liberated by boiling the compounds with an alcohol, for example ethanol, the chlorine formed oxidising a part of the solvent to acetaldehyde. On the other hand, after rearrangement, the chlorine atom shows greater stability, being substantially comparable in its reactivity wtih that found in a compound such as benzyl chloride. This reactivity is sufficiently high for the benzodiazepines which carry a chlorine atom as a substituent in the $R^1$ group in the α-position to the heterocycle to be valuable intermediates for the preparation of new derivatives which constitute an important aspect of this invention. Thus:

(1) By removal of one molecule of hydrogen chloride with the resultant formation of a double bond, the monochloro compounds give rise to the corresponding cycloalkenyl and alkenyl derivatives. The process may, for example, be carried out in dimethyl formamide by heating with lithium carbonate in the presence of a small quantity of a lithium halide, for example, the bromide. The reaction is rendered apparent by the evolution of carbon dioxide gas; it thus becomes possible to follow the progress of the reaction and to choose a suitable temperature to which to heat the reaction mixture in each case. In practice, it is advantageous to heat to the minimum temperature (80 to 120° C.) required to provide a sufficient evolution of carbon dioxide; an unduly high temperature reduces the yield. To isolate the product, the mineral salts are separated, the dimethylformamide is evaporated under reduced pressure, the residue diluted with water and the solid which separates dried an recrystallised from a suitable solvent.

In their infrared spectra, these ethylenically unsaturated derivatives show, inter alia, an N—H band at 3400 cm.$^{-1}$, a C=O band at 1690 cm.$^{-1}$ and a band which is sometimes double, in the region of 1600 cm.$^{-1}$. The ethylenically unsaturated derivatives when subjected to N-chlorination show a C=O band at about 1710 cm.$^{-1}$ and there is an absence of an N—H band at 3400 cm.$^{-1}$. When subjected to N-alkylation with a lower alkyl group, e.g. a methyl group, there is a C=O band in the region of 1680 cm.$^{-1}$ but absence of an N—H band at 3400 cm.$^{-1}$. To effect the N-chlorination, the technique described above is used (reaction with a metal or an organic hypochlorite). The N-alkylation is best carried out in solution in dimethyl formamide using a lower alkyl halide in the presence of an alkaline reacting metal compound, such as an alkali metal alkoxide, e.g. sodium methylate. Alternatively, a lower dialkyl sulphate such as dimethyl sulphate may be used in the presence of an alkaline reacting metal compound, such as an alkali metal carbonate, e.g. potassium carbonate.

As an example, the course of the reactions which can be carried out on 7-chloro-5-cyclohexyl-2-oxo-2,3-di-hydro 1H-benzo(f)diazepine-1,4 are set out below.

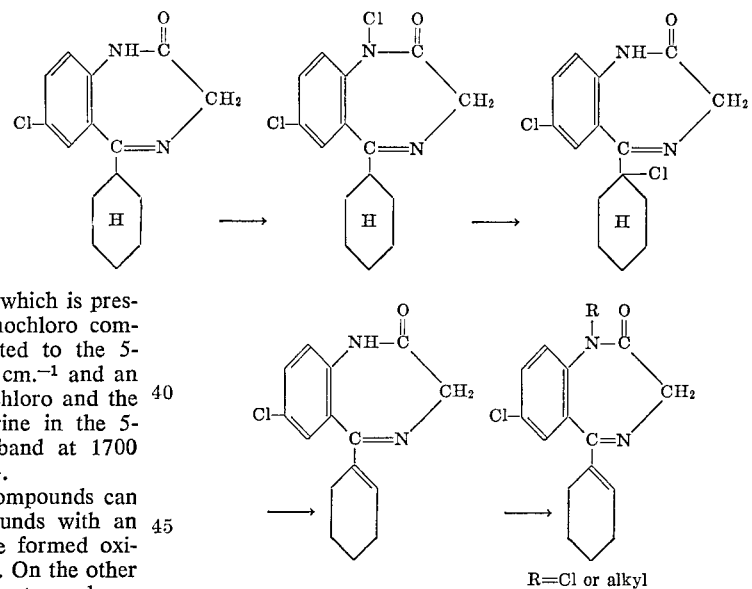

R=Cl or alkyl (2) If dehydrohalogenation is effected using diethylamine or one of its homologues such as dibutylamine and if $R^1$ is a 1-chlorocyclohexyl or 1-chlorocyclopentyl group, a dehydrochlorination reaction which follows a different course takes place and for the most part leads to the formation of a double bond accompanied by dehydrohalogenation; the products obtained, which are bright yellow, are isomeric with but not identical with the pale yellow ethylenically unsaturated compounds prepared from the same monochloro derivatives by the method described under (1) using lithium carbonate and dimethylformamide.

The structure of the two classes of isomeric compounds has been studied in the case in which the substituent $R^1$ in the parent compound (4253CB) from which they are obtained is a 1-chlorocyclohexyl group. In this case, the two isomeric unsaturated compounds (4260CB and 4386CB) give on hydrogenation over platinum at room temperature, the same compound, namely 7-chloro-5-cyclohexyl - 2 - oxo-2,3,4,5-tetrahydro 1H-benzo(f)diazepine-1,4 which is also obtained by reducing, under the same conditions, 7-chloro-5-cyclohexyl-2-oxo-2,3-dihydro 1H-benzo(f)diazepine-1,4. This shows that the products 4260CB and 4386CB both have the benzodiazepine ring and differ only by the position of one or more double bonds. As a result of studying the nuclear magnetic resonance spectra it is possible to indicate that in the compound 4260CB, the substituent $R^1$ is 1-cyclohexenyl whereas in the compound 4386CB, $R^1$ is a cyclohexylidene group formed with displacement of the heterocyclic double bond from between the 5 and 4 positions to between the 4 and 3 positions.

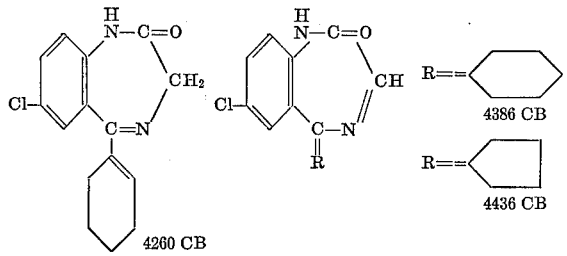

The infrared spectra of the compounds 4386CB and 4436CB differ from the spectra of products of the type 4260CB by the absence of a band in the region of 1600 cm.$^{-1}$; the C=O band is situated at 1670–1680 cm.$^{-1}$ and the N—H band at 3400 cm.$^{-1}$. The ultraviolet spectra in ethanol show in the case of 4386CB two maxima at 235 m$\mu$ ($\epsilon$=17,500) and 368 m$\mu$ ($\epsilon$=800) and in the case of 4260CB two maxima at 227 m$\mu$ ($\epsilon$=31,300) and 312.5 m$\mu$ ($\epsilon$=2300).

The following examples illustrate the invention; M.P.$_k$ indicates that the melting point is measured on a Kofler bench.

EXAMPLE 1

1,7-dichloro-5-phenyl-2-oxo-2,3-dihydro 1H-benzo(f)-diazepin -1,4 (4254CB)

(A) Process using sodium hypochlorite.—40 ml. of a solution of sodium hypochlorite of 14.5 British chlorometric degrees are added to a suspension of 5.4 g. of 7 - chloro- 5 - phenyl - 2-oxo-2,3-dihydro 1H-benzo(f)diazepine-1,4 in 80 ml. of methylene chloride. The mixture is stirred at room temperature for 15 minutes; the solid dissolves rapidly. The organic layer is decanted, washed with water, dried over anhydrous sodium sulphate and the solvent evaporated under reduced pressure without exceeding a temperature of 30° C. The residue is taken up in a little di-isopropyl ether and the crystals which form are dried. They are recrystallised as rapidly as possible from ethyl acetate. Colourless crystals (3.9 g.; yield, 64%); M.P.$_k$=143–144° C. with decomposition.

(B) Process using tertiary-butyl hypochlorite.—1.2 g. of tertiary-butyl hypochlorite are added to a suspension of 2.7 g. of 7-chloro-5-phenyl-2-oxo-2,3-dihydro 1H-benzo(f)diazepine-1,4 in 20 ml. of methylene chloride and the mixture is stirred and at the same time cooled in a water bath for 30 minutes. The solid dissolves in about 15 minutes. The product is evaporated to dryness under reduced pressure at a temperature below 40° C. The residue is taken up in di-isopropyl ether and the crystals which separate are dried. Colourless crystals are obtained (2.8 g.; yield, 91%); M.P.$_k$=143–144° C. with decomposition.

EXAMPLE 2

1,7-dichloro-3-methyl-5-phenyl-2-oxo-2,3-dihydro 1H-benzo(f)diazepine-1,4 (4289CB)

The process is carried out as described in Example 1(A) but the 7-chloro-5-phenyl-2-oxo-2,3-dihydro 1H-benzo(f)diazepine-1,4 is replaced by an equimolecular quantity of 7-chloro-3-methyl-5-phenyl-2-oxo-2,3-dihydro 1H-benzo(f)diazepine-1,4. The product is obtained as colourless crystals from benzene; M.P.$_k$=185° C. (with decomposition). Yield, 58%.

EXAMPLE 3

1,7-dichloro-5-cyclohexyl-2-oxo-2,3-dihydro 1H-benzo-(f)diazepine-1,4 (4252CB)

(A) Process using sodium hypochlorite.—The process described in Example 1 is repeated the 7-chloro-5-phenyl-2-oxo-2,3-dihydro 1H-benzo(f)diazepine-1,4 being replaced by an equimolar quantity of 7-chloro-5-cyclohexyl-2-oxo-2,3-dihydro 1H-benzo(f)diazepine-1,4.

The colourless crystals are isolated in the same manner and recrystallised from ethyl acetate. M.P.$_k$=163° C. (with decomposition). Yield, 85%.

(B) Process using tertiary-butyl hypochlorite.—The process described in Example 1B is repeated the 7-chloro-5 - phenyl - 2 - oxo-2,3-dihydro 1H-benzo(f)diazepine-1,4 being replaced by an equimolecular quantity of 7-chloro-5-cyclohexyl-2-oxo-2,3-dihydro 1H-benzo(f)diazepine-1,4. The colourless crystals are isolated without recrystallisation. M.P.$_k$=161–162° C. (with decomposition). Yield, 98%.

EXAMPLE 4

7-chloro-5-(1′-chlorocyclohexyl)-2-oxo-2,3-dihydro 1H-benzo(f)diazepine-1,4 (4253CB)

A solution of 117 g. of the compound produced as described in Example 3 in 450 ml. ethyl acetate is heated under reflux until a precipitate begins to form. From then onwards reflux is continued until a negative reaction is obtained when the reaction mixture is tested with a solution of sodium iodide in acetone. The reaction mixture is left to cool and the solid which separates is dried. Colourless crystals (76 g.) are obtained. M.P.$_k$=194–195° C. (with decomposition). A second portion (14 g.) is isolated by concentrating the mother liquor. M.P.$_k$=194–195° C. (with decomposition). The total yield is 77%. The melting point is raised to 196–197° C. by recrystallisation from ethyl acetate.

EXAMPLE 5

7-chloro-5-(1′-chlorocyclopentyl)-2-oxo-2,3-dihydro 1H-benzo(f)diazepin-1,4 (4418CB)

Employing the procedure described in Example 1(A), 31.5 g. of 7-chloro-5-cyclopentyl-2-oxo-2,3-dihydro 1H-benzo(f)diazepine-1,4 dissolved in 480 ml. of methylene chloride are treated with 240 ml. of sodium hypochlorite solution of 14.5 British chlorometric degrees.

The oily product thus obtained is dissolved in 250 ml. of di-isopropylether and heated under reflux until a negative reaction is obtained when tested with a solution of sodium iodide in acetone. The reaction mixture is left to cool and the colourless crystals which separate are dried (25 g.; yield, 70%). M.P.$_k$=191° C. (with decomposition).

EXAMPLE 6

7-nitro-5-(1′-chlorocyclohexyl)-2-oxo-2,3-dihydro 1H-benzo(f)diazepine-1,4 (4427CB)

The procedure described in Example 5 is employed, 7-chloro-5-cyclopentyl-2-oxo-2,3-dihydro 1H-benzo(f)diazepine-1,4 being replaced by an equimolecular quantity of 7-nitro-5-cyclohexyl-2-oxo-2,3-dihydro 1H-benzo(f)diazepine-1,4. The product is obtained as yellowish crystals from xylene. M.P.$_k$=247° C. Yield, 87%.

EXAMPLE 7

7-chloro-5-(1′-chloroethyl)-2-oxo-2,3-dihydro 1H-benzo(f)diazepin-1,4 (4419CB)

(A) Using sodium hypochlorite.—The process is carried out as described in Example 5, 7-chloro-5-cyclopentyl-2-oxo-2,3-dihydro 1H-benzo(f)diazepine-1,4 being replaced by an equimolecular quantity of 7-chloro-5-ethyl-2-oxo-2,3-dihydro 1H-benzo(f)diazepine-1,4. The product is obtained as yellowish crystals from ethyl acetate M.P.$_k$=197° C. (with decomposition). Yield, 20%.

(B) Using tertiary-butyl hypochlorite.—A suspension of 2.35 g. of 7-chloro-5-ethyl-2-oxo-2,3-dihydro 1H-benzo(f)diazepine-1,4 in 20 ml. of methylene chloride is stirred at room temperature for one hour with 1.2 g. of tertiary-butyl hypochlorite. The solid dissolves rapidly and, after a few minutes, a colourless solid starts to precipitate. The reaction mixture is evaporated to dryness under reduced pressure at a temperature not exceeding 30° C. The residue is crystallised from ethyl acetate and is obtained as yellowish crystals (1.6 g.; yield, 61%); M.P.$_k$=197° C. (with decomposition).

EXAMPLE 8

7-chloro-5-(1'-chlorobutyl)-2-oxo-2,3-dihydro 1H-benzo(f)diazepine-1,4 (4420CB)

(A) Using sodium hypochlorite.—The procedure described in Example 5 is used, 7-chloro-5-cyclopentyl-2-oxo-2,3-dihydro 1H-benzo,f)diazepine-1,4 being replaced by an equimolecular quantity of 7-chloro-5-butyl-2-oxo-2,3-diydro 1H-benzo(f)diazepine-1,4. To effect the transposition, the di-isopropyl ether is replaced by an equal volume of ethyl acetate. The product is obtained as colourless crystals from di-isopropyl ether M.P.$_k$=128–129° C. (with decomposition). Yield, 67%.

(B) Using tertiary-butyl hypochlorite.—The procedure described in Example 7(B) is used, 7-chloro-5-ethyl-2-oxo-2,3-dihydro 1H-benzo(f)-diazepine-1,4 being replaced by an equimolecular quantity of 7-chloro-5-butyl-2-oxo-2,3-dihydro 1H-benzo(f)diazepine-1,4. The product is obtained as colourless crystals from di-isopropyl ether M.P.$_k$=128–129° C. (with decomposition). Yield, 81%.

EXAMPLE 9

7-chloro-5-(1'-chloro-1'-methyl-propyl)-2-oxo-2,3-dihydro 1H-benzo(f)diazepine-1,4 (4421CB)

Employing the procedure described in Example 1(B), 7 - chloro - 5 - (1' - methyl - propyl) - 2 - oxo - 2,3 - dihydro 1-H-benzo(f)diazepine-1,4 is treated with tertiary-butyl hypochlorite. The oily residue is taken up in di-isopropyl ether (8 volumes) and heated under reflux for 30 minutes. The solvent is evaporated under reduced pressure and the residue is crystallised from di-isopropyl ether. It is obtained as colourless crystals. M.P.$_k$=141° C. Yield, 50%.

EXAMPLE 10

1,7-dichloro-5-(1'-chloro-cyclohexyl)-2-oxo-2,3-dihydro 1H-benzo(f)diazepine-1,4 (4265CB)

The process described in Example 1(A) is repeated, the 7-chloro-5-phenyl-2-oxo-2,3-dihydro 1H - benzo(f)diazepine, 1,4 being replaced by an equimolecular quantity of 7-chloro-5-(1-chlorocyclohexyl)-2-oxo - 2,3 - dihydro 1H-benzo(f)diazepine-1,4. The product is obtained as yellowish crystals from di-isopropyl ether. M.P.$_k$=102° C. Yield, 62%.

EXAMPLE 11

7-chloro-5-dichloromethyl-2-oxo-2,3-dihydro 1H-benzo(f)diazepine-1,4 (4425CB)

A suspension of 8.3 g. of 7-chloro-5-methyl-2-oxo- 2,3-dihydro 1H-benzo(f)diazepine-1,4 in 80 ml. of methylene chloride is stirred at room temperature with 9.6 g. of tertiary-butyl hyprochlorite.

The product dissolves with evolution of heat and after about 1 hour, as a rule, heat is again evolved followed by a precipitation of crystals. The reaction mixture is stirred for a further one hour and then evaporated to dryness under reduced pressure at a temperature of 30° C. Di-isopropyl ether is added to the residue and the whole is heated to boiling for several minutes, and then cooled. The crystals which separate are dried and recrystallised from ethanol. The product is obtained as yellow crystals (6.2 g.; yield, 56%) M.P.$_k$=210° C. (with decomposition).

EXAMPLE 12

7-chloro-5-(1',1'-dichloro-ethyl)-2-oxo-2,3-dihydro 1H-benzo(f)diazepine-1,4 (4393CB)

The procedure described in Example 11 is repeated, 7-chloro-5-ethyl-2-oxo-2,3-dihydro 1H - benzo(f)diazepine-1,4 being replaced by an equimolecular quantity of 7-chloro-5-ethyl-2-oxo-2,3-dihydro 1H - benzo(f)diazepine-1,4. The product recrystallised from methanol is obtained as yellowish crystals and has a double melting point M.P.$_k$=160° C. (followed by resolidification and M.P.$_k$=190° C. (with decomposition). Yield, 73%.

EXAMPLE 13

7-chloro-5-(1',1'-dichloro-butyl)-2-oxo-2,3-dihydro 1H-benzo(f)diazepine-1,4 (4391CB)

(A) Starting from 7-chloro-5-(1'-chlorobutyl)-2-oxo-2,3-dihydro 1H-benzo(f)diazepine-1,4 (4391CB).—The process described in Example 5 is repeated, 7-chloro-5-cyclopentyl-2-oxo-2,3-dihydro 1H-benzo(f)diazepine-1,4 being replaced by an equimolar quantity of the 5-(1'-chlorobutyl) compound. The product recrystallised from ethyl acetate, is obtained as yellowish crystals. M.P.$_k$=208° C. Yield, 50%.

(B) Starting from 7-chloro-5-butyl-2-oxo-2,3-dihydro 1H-benzo(f)diazepine-1,4.—The process described in Example 11 is repeated, the 7-chloro-5-methyl-2-oxo-2,3-dihydro 1H-benzo(f)diazepine-1,4 being replaced by an equimolecular quantity of 7-chloro-5-butyl-2-oxo-2,3-dihydro 1H-benzo(f)diazepine-1,4. The product recrystalised from ethyl acetate, is obtained as yellowish crystals. M.P.$_k$=208° C. Yield, 78%.

EXAMPLE 14

7-chloro-5-trichloromethyl-2-oxo-2,3-dihydro 1H-benzo(f)diazepine-1,4 (4426CB)

A suspension of 8.3 g. of 7-chloro-5-methyl-2-oxo-2,3-dihydro 1H-benzo(f)diazepine-1,4 in 80 ml. of methylene chloride is stirred at room temperature for 3 hours with 19.2 g. of tertiary-butyl hypochlorite. The solid dissolves with evolution of heat. When the reaction is complete, the reaction mixture is evaporated to dryness under reduced pressure at 30° C. The solid residue is dissolved in ethyl acetate and heated under reflux for 10 minutes. On allowing to cool crystals separate. They are dried and recrystallised from methanol. The product is obtained as white, matted crystals (3.5 g.) M.P.$_k$=185° C. (with decomposition).

A second portion (1.5 g.) is obtained on evaporating the mother liquor. M.P.$_k$ identical. Yield, 40%.

EXAMPLE 15

7-chloro-5-(1'-cyclohexenyl)-2-oxo-2,3-dihydro 1H-benzo(f)diazepine-1,4 (4260CB)

68 g. of 7 - chloro-5-(1'-chlorocyclohexyl(-2-oxo-2,3-dihydro 1H-benzo(f)diazepine-1,4, 34 g. of lithium carbonate and 17 g. of lithium bromide and 340 ml. of anhydrous dimethyl formamide are placed in a three-necked flask equipped with a mechanical stirrer, immersion thermometer and a reflux condenser connected with a bubble counter.

The reaction mixture is gradually heated, with stirring, until evolution of carbon dioxide commences (about 100° C.) and the temperature is maintained thereat until the reaction ceases. The temperature is then raised to 110° C. and held thereat for 15 minutes.

The reaction mixture is allowed to cool and the mineral salts separated and dried. The solvent is evaporated under reduced pressure and the residue dissolved in water. It is allowed to crystallise, dehydrated, dried and then recrystallised from ethyl acetate. The product is yellowish crystals (47.5 g.; yield 80%); M.P.$_k$=207–208° C.

EXAMPLE 16

7-nitro-5-(1'-cyclohexenyl)-2-oxo-2,3-dihydro 1H-benzo(f)diazepine-1,4 (4416 CB)

The method described in Example 15 is repeated, the compound obtained in Example 4 being replaced by an equimolar quantity of the compound obtained in Example 6. The product is obtained as yellow crystals, M.P.$_k$= 229° C. from ethyl acetate. Yield, 70%.

EXAMPLE 17

7-chloro-5-(1'-cyclopentenyl)-2-oxo-2,3-dihydro 1H-benzo(f)diazepine-1,4 (4310CB)

The process described in Example 15 is repeated, the compound obtained in Example 4 being replaced by an equimolar quantity of the compound obtained in Example 5. The product is obtained as yellow crystals. M.P.$_k$=204–205° C. from ethyl acetate. Yield, 38%.

EXAMPLE 18

7-chloro-5-(1'-methyl-1'-propenyl)-2-oxo-2,3-dihydro 1H-benzo(f)diazepine-1,4 (4422CB)

The process described in Example 15 is repeated, the compound obtained in Example 4 being replaced by the stoichiometric quantity of the compound obtained in Example 9. The product is obtained as light yellow crystals. M.P.$_k$=168° C. from isopropyl ether. Yield, 30%.

EXAMPLE 19

7-chloro-5-(1'-cyclohexenyl)-1-methyl-2-oxo-2,3-dihydro 1H-benzo(f)diazepine-1,4 (4261CB)

9.7 g. of sodium methylate are added to a solution of 16.5 g. of the compound obtained in Example 15 dissolved in 120 ml. of dry dimethylformamide and the mixture stirred for one half hour. The reaction mixture is cooled in a water bath and a solution of 33.8 g. of methyl iodide dissolved in 35 ml. of anhydrous dimethylformamide is then slowly added with stirring. The solution becomes dark brown in colour and a precipitate forms. It is stirred for 2 hours, then diluted with a large volume of water and extracted with ethyl acetate. The ethyl acetate solution is washed with water, dried over anhydrous sodium sulphate and the solvent evaporated under reduced pressure. The residue is crystallised from a small volume of ethyl acetate. Brownish yellow crystals (9 g.; yield, 52%) are obtained. M.P.$_k$=144° C.

EXAMPLE 20

7-chloro-5-(1'-cyclopentenyl)-1-methyl-2-oxo-2,3-dihydro 1H-benzo(f)diazepine-1,4 (4423CB)

The process described in Example 19 is repeated, the compound obtained in Example 15 being replaced by an equimolar quantity of the compound obtained in Example 17. Brownish yellow crystals are obtained on recrystallising from isopropyl ether. M.P.$_k$=150° C. Yield, 50%.

EXAMPLE 21

1,7-dichloro-5-(1'-cyclohexenyl)-2-oxo-2,3-dihydro 1H-benzo(f)diazepine-1,4 (4424CB)

The process described in Example 1(A) is repeated, 7-chloro-5-phenyl-2-oxo-2,3-dihydro 1H-benzo(f)diazepine-1,4 being replaced by an equimolar quantity of the compound obtained in Example 15. Colourless crystals are obtained on recrystallising from isopropyl ether. M.P.$_k$=134° C. Yield, 56%.

EXAMPLE 22

7-chloro-5-cyclohexylidene-2-oxo-1,2-dihydro 5H-benzo(f)diazepine-1,4 (4386CB)

20 g. of the compound obtained in Example 4 and 75 ml. of diethylamine are stirred at room temperature. The solid rapidly dissolves to give a yellow solution whilst the temperature spontaneously rises to about 40° C. The reaction product is then left for 2 hours. Excess diethylamine is then evaporated off at ordinary temperature under reduced pressure. The residue is taken up in a dilute solution of sodium carbonate and ether. The solid which crystallises is dried and washed with water and ether.

After recrystallisation from acetone, yellow crystals are obtained (10 g.; yield 57%); M.P.$_k$=218° C.

It has also been found that the N-chloro derivatives of carboxamides, sulphonamides and the imides of polycarboxylic acids can be used in the above halogenation and that when this is done an alkyl group may be present in the 1-position prior to carrying out the halogenation. In this way those benzodiazepines having an alkyl substituent in the 1-poistion and an alkenyl or cycloalkenyl substituent in the 5-position are rendered more readily available. Moreover this reaction can be carried out when the substituent in the 3-position is an esterified carboxylic acid group or a dicarbalkoxymethyl group.

The N-chloro derivatives combine both a halogen donor element and a receiving element so that the reaction may be regarded as related to a Ziegler halogenation.

The N-chloroimide may be chlorosuccinimide which directly provides benzodiazepine derivatives which are chlorinated on the substituent in the 5-position by an intermolecular mechanism.

Depending upon the number of hydrogen atoms present upon the α-carbon atom of the 5-substituent and the quantity of chlorinating agent used, one, two or even three chlorine atoms can be introduced.

The reaction may be carried out in the presence of a diluent which may be carbon tetrachloride, a halogenated aliphatic hydrocarbon such as methylene chloride or chloroform or an aromatic hydrocarbon such as benzene. It is advantageous to work at the boiling point of the diluent; the reaction time does not exceed a few hours. If the theoretical quantity of chlorinating agent is used, the end of the reaction may be checked by the absence of any oxidising reaction of the reaction medium (test with a solution of sodium iodide in acetone). At the end of the reaction one may, if N-chlorosuccinimide is used as halogenating agent, remove the succinimide formed by washing with water and isolating the product by evaporation of the solvent and crystallisation of the residue from a suitable solvent, such as ethyl acetate or di-isopropyl ether.

This process renders accessible chlorinated derivatives, especially the chlorine derivatives of 5-substituted 1-alkylbenzodiazepines which have not hitherto been readily available, for example:

7-chloro-5(1'-chlorocyclohexyl)-1-methyl-2-oxo-2,3-dihydro-1H-benzo(f)diazepine-1,4, and
7-Nitro-5(1'-chlorocyclohexyl)-1-methyl-2-oxo-2,3-dihydro-1H-benzo(f)diazepine-1,4.

The following examples illustrate this aspect of the invention.

EXAMPLE 23

7-chloro-5(1'-chlorocyclohexyl)-2-oxo-2,3-dihydro-1H-benzo(f)diazepine-1,4

44 g. of 7-chloro-5-cyclohexyl-2-oxo-2,3-dihydro-1H-benzo(f) diazepine-1,4 and 22 g. of N-chlorosuccinimide in 440 ml. of carbon tetrachloride are heated under reflux for 2.5 hours. When the operation is finished, the resulting organic solution is washed with water and from this solution 24.8 g. of a product which melts at 196° C. precipitate. By concentration of the solution, a second batch (23.3 g.) of a product which has the same melting point is obtained. The yield is 87%. The product can be recrystallised from ethyl acetate, M.P.$_k$=197° C.

EXAMPLE 24

7-chloro-5(1'-chlorocyclohexyl)-1-methyl-2-oxo-2,3-dihydro-1H-benzo(f)diazepine-1,4

360 g. of 7-chloro-5-cyclohexyl-1-methyl-2-oxo-2,3-dibenzo(f)diazepine-1,4 and 22 g. of N-chlorosuccinimide in 3100 ml. of anhydrous benzene are heated under reflux for 1.5 hours. At the end of the reaction, the reaction mixture is washed twice with a litre of water and dried over sodium sulphate; it is filtered and evaporated to dryness. The chloro derivative is thereby obtained in substantially quantitative yield in a sufficiently high state of purity for the dehydrohalogenation reaction. It can be recrystallised from di-isopropylether and is then obtained in the form of white crystals having a melting point of 110° C.

EXAMPLE 25

(A) 7-nitro-5-(1'-chlorocyclohexyl)-1-methyl-2-oxo-2,3-dihydro-1H-benzo(f)diazepine-1,4

16 g. of N-chlorosuccinimide are added to a solution of 32 g. of 7-nitro-5-cyclohexyl-1-methyl-2-oxo-2,3-dihydro-1H-benzo(f)diazepine-1,4 in 450 ml. of carbon tetrachloride and the reaction mixture is heated under reflux for 1.5 hours. The reaction, which starts vigorously, has to be moderated at the beginning. When the operation is finished, 250 ml. of water are added to the hot reaction mixture and the resulting mixture is vigorously stirred for 15 minutes and then left to cool until complete crystallisation has taken place. The crystals which separate are then separated by filtration. The product is washed with water and a little carbon tetrachloride and then recrystallised from ethyl acetate. 32.25 g. of a product of M.P.$_k$=190° C. is thereby obtained in two batches. By evaporation of the remaining tetrachloride, a further 0.9 g. of product having the same melting point is obtained. The total yield (33.15 g.) is 92.9%.

(B) 7-nitro-5-(cyclohexen-1'-yl)-1-methyl-2-oxo-2,3-dihydro-1H-benzo(f)diazepine-1,4

10 g. of the product prepared as described under (A) dissolved in 100 ml. of dimethylformamide to which is added 10 g. of lithium carbonate is heated at 100° C. with stirring. The reaction is complete when liberation of carbon dioxide gas ceases. When the operation is finished, the reaction product is cooled and filtered to remove the mineral salts and the filtrate is evaporated on a water bath under reduced pressure; the residue is treated with ether and water and the suspension is cooled in ice. 8.35 g. of product are obtained in two batches from the ethereal solution and recrystallised from ethyl acetate. 5.1 g. of yellow crystals are obtained: M.P.$_k$=159° C. 1.5 g. of a product of melting point M.P.$_k$=157° C. are obtained by concentration of the residual ethyl acetate: Yield: 74%.

EXAMPLES 26 TO 31

Employing the technique of Example 23, the compounds identified in Table I are obtained.

TABLE 1

| No. of example: | Kofler melting point (crystallisation solvent) |
| --- | --- |
| 26 | 192° (ethyl acetate). |
| 27 | 141° (isopropyl ether). |
| 28 | 194° (ethanol). |
| 29 | 230° instantaneous (ethyl acetate). |
| 30 | 160° (isopropyl ether+ethyl acetate). |
| 31 | 208° (ethyl acetate). |

For all the products cited, analyses of the elements agree very closely with the theoretical values. The infrared and ultraviolet spectra as well as the nuclear magnetic resonance spectra are in agreement with the structure.

The starting materials used in preparing these products were:

| Example No: | Starting material |
| --- | --- |
| 26 | 7-chloro-5-cyclohexyl-3-methyl-2-oxo-2,3-dihydro-1H-benzo(f)diazepine-1,4. |
| 27 | 7-chloro-5-cyclohexyl-1,3-dimethyl-2-oxo-2,3-dihydro-1H-benzo(f)diazepine-1,4. |
| 28 | 7-chloro-5-cyclohexyl-3-methoxy-2-oxo-2,3-dihydro-1H-benzo(f)diazepine-1,4 |
| 29 | 7-chloro-5-cyclohexyl-3-carbethoxy-2-oxo-2,3-dihydro-1H-benzo(f)diazepine-1,4. |
| 30 | 7-chloro-5-cyclohexyl-3-biscarbethoxymethyl-2-oxo-2,3-dihydro-1H-benzo(f)diazepine-1,4. |
| 31 | 7-chloro-5-(α-chloro-n-butyl)-2-oxo-2,3-dihydro-1H-benzo(f)diazepine-1,4. |

EXAMPLE 32

This illustrates the production of the final product of Example 25 by methylation of the corresponding 5-(cyclohexen-1'-yl) compound.

A solution of 7-nitro-5-(cyclohexen-1'-yl)-2-oxo-2,3-dihydro-1H-benzo(f)diazepine-1,4 (0.5 g.) in anhydrous dimethylformamide (5 ml.) containing 0.3 g. of sodium methoxide was stirred for half an hour at room temperature. The solution was cooled in an ice-water bath and a solution of methyl iodide (1 g.) in anhydrous dimethylformamide (1 ml.) was added thereto. After completion of the addition, the mixture was stirred for 3 hours at room temperature. A large excess of water was next added and the mixture then extracted twice with ethyl acetate, the combined extracts washed with water, dried over anhydrous sodium sulphate and concentrated to a small volume. Yellow crystals were obtained M.P.$_k$= 163° C.

EXAMPLE 33

This example illustrates alkylation of the 1-position using a lower dialkyl sulphate as the alkylation agent.

A reaction mixture was made up from 0.5 g. of 7-nitro-5 - (cyclohexen - 1' - yl) - 2 - oxo - 2,3 - dihydro - 1H-benzo(f)diazepine-1,4, potassium carbonate (1 g.) and dimethyl sulphate (0.6 ml.) dissolved in 10 ml. of absolute ethanol. After stirring for 16 hours at room temperature the solvent was evaporated under reduced pressure on a water-bath and the residue taken up in a mixture of water and ethyl acetate. The organic layer was separated, washed with water, dried over anhydrous sodium sulphate and concentrated to small volume whereupon yellow crystals separated, M.P.$_k$=163° C. identical with those of the previous example. A second crop of crystals was obtained on concentrating the residue.

The various compounds described were subjected to tests designed to investigate their physiological properties.

(A) Action on the central nervous system

The compounds were administered in varying doses to groups of 10 animals (rats or mice) which were then subjected to tests to demonstrate the activity of the compounds on the central nervous system. The responses to the different tests carried out on the groups of animals treated were in each case compared with those obtained on groups of control animals.

The following tests were used:

traction (mice) which demonstrates the relaxing effect on striated muscle;
rotating rod (mice) which demonstrates the effect on equilibration;
exploration (mice) which appeals to the natural curiosity of mice,
spontaneous aktography (mice) and spontaneous motor activity (rats), by means of which it is possible to demonstrate the action of the products on the psycho-motor sphere, mice normally having very high mobility whereas rats manifest little displacement.

Combativity (rats).—This test consists in rendering two male rats aggressive towards each other by the passage of an electric current of adjustable voltage through the floor of the cage in which the rats are placed.

Electric shock (mice).—By adjusting the voltage and the amperage of the current used, it is possible to predetermine the percentage of animals treated and protected when compared with control animals.

Convulsions induced by pentetrazole (mice).—Pentetrazole injected intraperitoneally in mice in a dose of 100 to 125 mg./kg. body weight determines the violent and fatal convulsive crises that can be counteracted by compounds having anticonvulsant activity.

The results obtained are set out in the table in which group in the substituent $R^4$ reinforces the activity. The introduction of a methyl group as the substituent $R^2$ appears to increase the activity slightly.

Lastly, the replacement of the cyclohexenyl group at $R^1$ by the cyclopentenyl group diminishes the activity.

TABLE 2

[Pharmacodynamic actions on the central nervous system. Does expressed in mg./kg. administered orally]

| No. of compound | Traction (mice) | | Rotating rod (mice) | | Spontaneous aktography (mice) | | Spontaneous motor activity (rats) | | Combativ- ness (rats) | | Electric shock (mice) | | Pentetrazole (mice) | | Exploration (mice) | |
|---|---|---|---|---|---|---|---|---|---|---|---|---|---|---|---|---|
| | Dose | Effect | D | E | D | E | D | E | D | E | D | E | D | E | D | E |
| 4254 | 2.5 | −50 | 2.5 | −10 | | | 50 | −63 | 50 | 0 | 2.5 | P20 | 2.5 | P80 | 2.5 | −35 |
| | 5 | −80 | 5 | −60 | | | | | 100 | 0 | 5 | P10 | 5 | P90 | 5 | −40 |
| | | | | | | | | | | | 10 | P40 | 10 | P90 | 10 | −50 |
| | | | | | | | | | | | 25 | P45 | | | | |
| | | | | | | | | | | | 50 | P50 | | | | |
| 4289 | 2.5 | −20 | 2.5 | 0 | 20 | 0 | 10 | n.s. | 50 | 0 | 100 | P10 | 25 | P0 | 5 | −45 |
| | 5 | −70 | 5 | −10 | | | 25 | −80 | 100 | 0 | | | 50 | P0 | 10 | −57 |
| | 10 | −40 | 10 | −40 | | | | | | | | | | | 50 | −61 |
| | 20 | −90 | 20 | −40 | | | | | | | | | | | 100 | 100 |
| 4252 | 10 | −60 | 10 | 0 | | | 100 | 0 | 50 | 0 | 5 | P10 | 5 | 0 | 5 | −20 |
| | 25 | −60 | 25 | −10 | | | | | 100 | 0 | 10 | P20 | 10 | 0 | 10 | −16 |
| | 50 | −100 | 50 | −30 | | | | | | | | | | | | |
| | 100 | −100 | 100 | −20 | | | | | | | | | | | | |
| 4253 | 100 | 0 | 100 | 0 | | | | | | | 25 | 0 | 10 | 0 | 50 | 0 |
| | | | | | | | | | | | 50 | 0 | 20 | 0 | 100 | 0 |
| | | | | | | | | | | | 75 | P40 | 50 | 0 | | |
| | | | | | | | | | | | 100 | P60 | 100 | 0 | | |
| 4265 | 50 | 0 | 50 | 0 | 100 | 0 | 100 | 0 | 50 | 0 | 50 | P20 | 50 | P20 | 50 | 0 |
| | 100 | 0 | 100 | 0 | | | | | 100 | 0 | 100 | P20 | 100 | P20 | 100 | 0 |
| 4293 | 5 | −40 | 5 | 0 | 20 | 0 | | | | | 5 | 0 | 5 | 0 | 5 | 0 |
| | 10 | −50 | 10 | −30 | | | | | | | 10 | 0 | 10 | 0 | 10 | −18 |
| 4391 | 5 | −40 | 5 | −20 | 10 | 0 | | | | | 10 | 0 | | | 5 | −19 |
| | 10 | −50 | 10 | −20 | 20 | −43 | | | | | | | | | 10 | −29 |
| | 20 | −50 | 20 | −20 | | | | | | | | | | | | |
| | 50 | −60 | 50 | −20 | | | | | | | | | | | | |
| 4260 | 10 | −40 | 10 | −15 | 100 | −35 | 100 | −35 | 50 | 0 | 25 | P20 | 10 | P10 | 25 | −13 |
| | 25 | −40 | 25 | −15 | | | | | 100 | 0 | 50 | P0 | 25 | P40 | 50 | −47 |
| | 50 | −65 | 50 | −15 | | | | | | | 100 | P0 | 50 | P40 | 100 | −59 |
| | 100 | −95 | 100 | −30 | | | | | | | | | 100 | P90 | | |
| 4416 | 5 | −60 | 5 | −10 | 20 | 0 | | | | | 5 | P10 | 5 | P10 | 5 | −5 |
| | 10 | −100 | 10 | −20 | | | | | | | 10 | P10 | 10 | P20 | 10 | 0 |
| | 25 | −10 | 25 | −10 | | | | | | | 25 | P10 | 25 | P10 | 25 | −22 |
| | 50 | −90 | 50 | −30 | | | | | | | 50 | P10 | 50 | P70 | 50 | −24 |
| | 100 | −95 | 100 | −10 | | | | | | | | | 100 | P100 | | |
| 4310 | 5 | −30 | 5 | 0 | | | | | | | 25 | P10 | 5 | P0 | 25 | −26 |
| | 10 | −60 | 10 | −20 | | | | | | | 50 | P30 | 10 | P0 | 50 | 0 |
| | 25 | −10 | 25 | −10 | | | | | | | | | 25 | P0 | | |
| | 50 | −50 | 50 | −10 | | | | | | | | | 50 | P0 | | |
| 4261 | 5 | −40 | 5 | −10 | 50 | −50 | 100 | −75 | 50 | ...... | 5 | P0 | 5 | P0 | 25 | −21 |
| | 10 | −60 | 10 | −20 | 100 | −45 | | | 100 | ...... | 10 | P0 | 10 | P20 | 50 | −17 |
| | 25 | −70 | 25 | −15 | | | | | | | | | 25 | P40 | | |
| | 50 | −85 | 50 | −20 | | | | | | | | | 50 | P100 | | | the figures preceded by the sign (−) express the percentage inhibition compared with the groups of control animals; P indicates the protection in percent. The doses are expressed in milligrams per kg. of animal body weight. The route of administration was in all cases oral.

Investigation of the results shows that on the whole, all these compounds exert one or more actions on the central nervous system, but in more or less large doses.

(1) Amongst the N-chloro compounds, 4254CB exerts a marked myorelaxant activity; it disequilibrates a high proportion of animals from a dose of 5 mg./kg. upwards given orally, as do numerous neuroleptics and tranquilisers. It diminishes the spontaneous activity of mice and produces marked withdrawal of interest from the environment (exploration); lastly, it has distinct anticonvulsant properties both in response to electric shock and with regard to convulsions induced by pentetrazole.

The substitution of a methyl group at $R^3$ (4289CB) does not significantly modify the properties of 4254CB.

Replacement of the phenyl group by a cyclohexyl group at $R^1$ diminishes the activity in most of the tests and in particular in the tests for anticonvulsant properties.

(2) In the C-chloro compounds, a generally low activity is noted in all the tests compared with the compounds of the preceding group.

(3) In the compounds which are thylenically unsaturated in the α-position in the $R^1$ substituent the preponderance of the myorelaxant activity compared with the other activities becomes apparent, and in particular the anticonvulsant activity which is practically nil at small dosages.

By virtue of this predominant myorelaxant activity special therapeutic applications are indicated, in particular the treatment of myalgia. Replacement of chlorine by a nitro (B) Antiphlogistic activity Certain of the products mentioned have an antiphlogistic activity which is particularly marked in compounds 4425CB and 4426CB.

These two compounds have been studied in their behaviour towards rats by means of various tests:

Cotton granuloma test.
Variation in the weight of the thymus of the animals.
Variation in the weight of the suprarenals.
Oedema of the paw in response to carragheenin.

These four tests were carried out on the same rats and the rats were compared with a group of control rats and with a group of rats treated with a product used for comparison, namely hydrocortisone acetate.

The two products 4425 and 4426CB were administered orally for 5 consecutive days in a dose of 250 mg./kg./day. The first treatment was carried out on the day of implantation of the pellets of cotton under the skin of the rats. Hydrocortisone was also administered orally but in a dose of 50 mg./kg./day. The control rats are given the solvent for the products used (5% gum in water).

On the day of the last treatment, the rats were given an injection of carragheenin under the plantar aponeurosis of the right posterior paw. The paws were measured before the injection of carragheenin and then 3 hours and 24 hours later.

On the day following the last treatment, the rats were sacrificed; the suprarenals, the thymus glands and the granulomata formed round the pellets of cotton were removed and weighed (after drying).

Results.—The results summarised in the following Table 3 are expressed in percent based on the controls and the coefficient (t) is calculated to find out whether the figures are significant.

gesics, spasmolytics, antiulcerative agents, hypnotics and cardiac sedatives.

TABLE 3

| Product | Total dose received, g./kg. | Weight of granulomata | | Weight of thymus glands | | Weight of suprarenals | | OEDEMA WITH CARRAGHEENIN | | | |
|---|---|---|---|---|---|---|---|---|---|---|---|
| | | | | | | | | 3 hours | | 24 hours | |
| | | Per 100 of controls | (t) | Per 100 of controls | (t) | Per 100 of controls | (t) | Per 100 of controls | (t) | Per 100 of controls | (t) |
| 4425 | 1.25 | −6.9 | 1.44 | −1.5 | 0.15 | +3.4 | 0.81 | −52.2 | 2.87 | −19.4 | 0.9 |
| 4426 | 1.25 | −20.8 | 5.09 | −31 | 3.12 | +8.2 | 1.92 | −44.6 | 3.13 | +25.8 | ---- |
| Hydrocortisone acetate | 0.25 | −23.4 | 5.72 | −62.2 | 8.64 | −15.4 | 13.8 | −56.6 | 3.46 | −40.4 | 2.5 |

On examination of the results obtained, it is found:

(1) That compounds 4254CB and 4289CB are of particular interest for their sedative action on the central nervous system;

(2) That compounds 4260CB, 4261CB and 4416CB are of particular interest for their action on the central nervous system and for their myorelaxant effect; and (3) That compounds 4425CB and 4426CB are of particular interest as antiphlogistic agents.

On account of their sedative properties, especially on the central nervous system, the compounds listed under 1 and 2 may be used therapeutically in pathological states such as states of agitation, irritability, aggressiveness and insomnia, neurotic and psychotic states and in certain psychomatic syndromes, certain character and behaviour defects and certain muscular spasms or contractures.

Compounds 4425CB and 4426CB may be used therapeutically for their antiphlogistic properties in diseases responding to such an action, such as rheumatic diseases.

The compound 7-nitro-5(cyclohexen-1'-yl)-1-methyl-2-oxo-2,3-dihydro-1H-benzo(f)diazepine-1,4 (4857CB) includes a number of the features indicated above to be of special therapeutic interest and tests carried out with it indicate particularly valuable properties from a physiological point of view. Table 4 indicates the principal properties of this product, determined in the manner set out above.

TABLE 4

| Nature of activity | Test | ED$_{50}$ in mg./kg. body weight orally |
|---|---|---|
| Reaction to environment | Spontaneous displacement (mice) | 22.5 |
| Do | Spontaneous motor activity (rat) | [1] 25 |
| Do | Rotating rod equilibration test (mice) | 5 |
| Myorelaxant action | Traction (mice) | 9 |
| Anticonvulsant action | Antipentetrazole (mice) | 12 |
| Do | Antielectric shock (mice) | [1] 50 |
| Anxiety relieving action | Exploration (mice) | [1] 25 |
| Do | Provoked aggressiveness (rat) | <10 |

[1] Approximately.

These figures demonstrate that the compound has a powerful action upon the central nervous system. Acute toxicity towards mice is only observed when more than 100 mg./kg. is administered orally.

It will be appreciated from the above results that the dosage in which the compounds are used will depend upon the effect that it is desired to produce. Dosages of 10 to 25 mgm. taken orally are suitable for human medication with an overall daily dosage of 10 to 200 mgm. and may be given for insomnia, anxiety neurosis, nervous tension, hypermotility, irritability and muscular and visceral ailments arining from excessive psychic tension. This recommendation is based upon the results obtained with the product 4857CB reported in Table 4.

The products are also useful in veterinary medicine for the tranquillisation of animals, e.g., prior to transport, prior to minor surgery and during training.

In human medication the compounds may be administered by any route but in veterinary medicine the parenteral route is preferred.

The compounds may be used in admixture with other pharmacologically active substances such as central analgesics, spasmolytics, antiulcerative agents, hypnotics and cardiac sedatives.

The pharmaceutical preparations containing the products of the invention may be so formulated that the product can be administered in unit doses in an amount of the order of 0.5 mg. to 200 mg. Typical preparations are described below by way of example.

TABLETS

Example A.—7-chloro-5 - (1'-cyclohexenyl)-2-oxo-2,3-dihydro-1H-benzo(f)diazepine-1,4 (4260CB)—50 mg.; excipient—q.s. for a tablet.

Example B.—1,7 - dichloro-5-phenyl-2-oxo-2,3-dihydro 1H-benzo(f)diazepine-1,4 (4254CB)—10 mg.; excipient—q.s. for a tablet.

Example C.—7-chloro-5-(1'-cyclohexenyl)-1-methyl-2-oxo-2,3-dihydro 1H-benzo(f)diazepine-1,4 (4261CB)—50 mg.; excipient—q.s. for a tablet.

Example D.—7 - chloro-5-trichloromethyl-2-oxo-2,3-dihydro 1H-benzo(f)diazepine-1,4 (4426CB)—50 mg.; excipient—q.s. for a tablet.

The tablets may be prepared by the usual method of double compression or granulation employing an aqueous gum solution or a nonaqueous solvent such as ethyl alcohol. The excipients used may be, for example, starch, talcum, gum arabic, magnesium stearate or carboxymethyl cellulose. The tablets may be made suitable for intestinal absorption by glutinisation or by coating with a substance resistant to the action of the gastric juices, for example cellulose acetophthalate, in order to prevent the gastric hydrochloric acid acting on the active principle as well as in order to prevent any possible subsequent gastric troubles. The tablets may or may not be coated with an opaque sugar coating which may, if desired, be coloured.

I claim:

1. A 5-substituted benzodiazepine having the formula wherein $R^1$ is 1-chlorocyclohexyl or α-cyclohexenyl, and $R^4$ is a chlorine atom or a nitro group.

2. The benzodiazepine claimed in claim 1 in which $R^1$ is 1-chlorocyclohexyl, and $R^4$ is a chlorine atom in the 7-position.

3. The benzodiazepine claimed in claim 1 in which $R^1$ is 1-chlorocyclohexyl, and $R^4$ is a nitro group in the 7-position.

4. The benzodiazepine claimed in claim 1 in which $R^1$ is a α-cyclohexenyl, and $R^4$ is a nitro group in the 7-position.

5. A process for producing a chlorobenzodiazepine having the formula

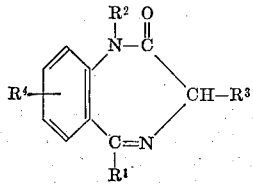

in which $R^1$ is selected from the group consisting of phenyl and the group having the general formula

in which $R^5$ and $R^6$ are individually selected from the group consisting of hydrogen, chlorine and lower alkyl or $R^5$ and $R^6$ collectively with the carbon atom to which they are attached represent cycloalkyl having 5–6 carbon atoms and $R^7$ is selected from the group consisting of hydrogen and chlorine: $R^2$ is selected from the group consisting of hydrogen, halogen and lower alkyl with the provisos (a) that at least one of $R^2$, $R^5$, $R^6$ and $R^7$ is chlorine and (b) that when $R^1$ is phenyl $R^2$ is chlorine: $R^3$ is selected from the group consisting of hydrogen and lower alkyl: and $R^4$ is selected from the group consisting of hydrogen, halogen, lower alkyl, lower alkoxy, trifluoromethyl and nitro, which comprises treating a benzodiazepine having the formula

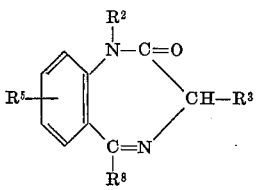

in which $R^2$, $R^3$ and $R^4$ are as above defined and $R^8$ is selected from the group consiting of phenyl and a group having the formula

in which $R^5$ and $R^6$ are as above defined, with a chlorinating agent selected from the group consisting of hypochlorites and N-chloro derivatives of carboxamides, sulphonamides and imides of polycarboxylic acids.

6. The process of claim 5 in which $R^2$ is hydrogen, $R^3$ is hydrogen, $R^4$ is a chlorine atom in the 7-position and $R^8$ is phenyl.

7. The process of claim 5 in which $R^2$ is hydrogen, $R^3$ is methyl, $R^4$ is a chlorine atom in the 7-position and $R^8$ is phenyl.

8. The process of claim 5 in which $R^2$ is hydrogen, $R^3$ is hydrogen, $R^4$ is a chlorine atom in the 7-position and $R^8$ is methyl and said chlorinating agent is used in an amount sufficient to introduce two chlorine atoms into the methyl group.

9. The process of claim 5 in which $R^2$ is hydrogen, $R^3$ is hydrogen, $R^4$ is a chlorine atom in the 7-position and $R^8$ is methyl and said chlorinating agent is used in an amount sufficient to introduce three chlorine atoms into the methyl group.

10. The process of claim 5 in which $R^2$ is hydrogen, $R^3$ is hydrogen, $R^4$ is a chlorine atom in the 7-position and $R^8$ is cyclohexyl and said chlorinating agent is used in an amount sufficient to introduce one chlorine atom into the cyclohexyl group.

11. The process of claim 5 in which $R^2$ is hydrogen, $R^3$ is hydrogen, $R^4$ is a nitro group in the 7-position and $R^8$ is cyclohexyl and said chlorinating agent is used in an amount sufficient to introduce one chlorine atom into the cyclohexyl group.

12. The process of claim 5 in which said N-chloroimide is N-chlorosuccinimide.

13. The process of claim 5 in which $R^2$ is methyl, $R^3$ is hydrogen, $R^4$ is a chlorine atom in the 7-position and $R^8$ is cyclohexyl and said N-chloro derivative is used in an amount sufficient to introduce one chlorine atom into the cyclohexyl group.

14. The process of claim 5 in which $R^2$ is methyl, $R^3$ is hydrogen, $R^4$ is nitro present in the 7-position and $R^8$ is cyclohexyl and said N-chloro derivative is used in an amount sufficient to introduce one chlorine atom into the cyclohexyl group.

15. A process for the production of a 5-substituted benzodiazepine having the formula

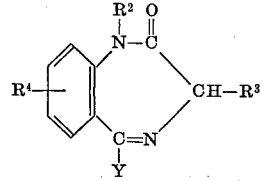

in which $R^2$, $R^3$ and $R^4$ are as defined in caim 5 and Y is selected from the group consisting of lower α-alkenyl and α-cycloalkenyl groups having 5–6 carbon atoms which comprises (a) producing by the process of claim 13 a C-monochlorobenzodiazepine in which $R^1$ is a group having the formula

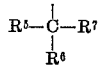

in which at least one of $R^5$ and $R^6$ is lower alkyl or $R^5$ and $R^6$ jointly with the carbon atom to which they are attached represent cycloalkyl having 5–6 carbon atoms and one of $R^5$, $R^6$ and $R^7$ is a chlorine atom, and then (b) heating the said C-monochlorobenzodiazepine with a dehydrochlorinating agent.

16. The process of claim 15 in which $R^2$ is hydrogen, $R^3$ is hydrogen, $R^4$ is a chlorine atom in the 7-position and $R^5$ and $R^6$ collectively with the carbon atom to which they are attached represent cyclohexyl.

17. The process of claim 15 in which $R^2$ is hydrogen, $R^3$ is hydrogen, $R^4$ is a nitro group in the 7-position and $R^5$ and $R^6$ collectively with the carbon atom to which they are attached represent cyclohexyl.

18. The process of claim 15 in which $R^2$ is methyl, $R^3$ is hydrogen, $R^4$ is a chlorine atom in the 7-position and $R^5$ and $R^6$ collectively with the carbon atom to which they are attached represent cyclohexyl.

19. A process for the production of 5-substituted benzodiazepine having the formula

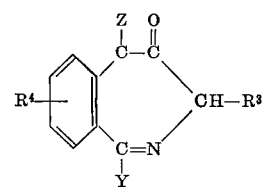

in which $R^3$ and $R^4$ are as defined in claim 5, Y is selected from the group consisting of lower α-alkenyl and α-cycloalkenyl groups having 5–6 carbon atoms and Z is lower alkyl which comprises (a) producing by the process of claim 5 a C-monochlorobenzodiazepine in which $R^2$ is hydrogen, $R^1$ is selected from α-cycloalkenyl and a group having the formula

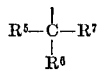

in which at least one of $R^5$ and $R^6$ is lower alkyl or $R^5$ and $R^6$ collectively with the carbon atom to which they are attached represent cycoalkyl having 5–6 carbon atoms and one of $R^5$, $R^6$ and $R^7$ is a chlorine atom, (b) heating the said C-monochlorobenzodiazepine with a dehydrochlorinating agent and (c) alkylating the reaction product of step (b) with an alkylating agent selected from lower alkyl halides and lower dialkyl sulphates in the presence of an alkaline reacting metal compound.

20. The process of claim 19 in which $R^3$ is hydrogen, $R^4$ is a chlorine atom in the 7-position, $R^5$ and $R^6$ collectively with the carbon atom to which they are attached represent cyclohexyl and the alkyl halide is a methyl halide.

21. A process for the production of a 5-cycloalkylidene benzodiazepine having the formula

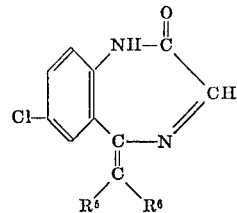

in which $R^5$ and $R^6$ collectively with the carbon atom to which they are attached represent cycloalkylidene having 5–6 carbon atoms which comprises (a) producing by the process of claim 5 a C-monochlorobenzodiazepine in which $R^2$ is hydrogen, $R^3$ is hydrogen, $R^4$ is a chlorine atom in the 7-position, $R^5$ and $R^6$ collectively with the carbon atom to which they are attached represent cycloalkyl having 5–6 carbon atoms and $R^7$ is a chlorine atom, by the process of claim 5 a C-monochlorobenzodiazepine with a dialkylamine in which each alkyl group contains at least two carbon atoms.

References Cited

UNITED STATES PATENTS 3,426,014   2/1969   Schmitt _____ 260—239.3

HENRY R. JILES, Primary Examiner

R. T. BOND, Assistant Examiner

U.S. Cl. X.R.

424—244

UNITED STATES PATENT OFFICE
CERTIFICATE OF CORRECTION

Patent No. 3,551,412          Dated December 29, 1970

Inventor(s)   Josef Schmitt

It is certified that error appears in the above-identified patent and that said Letters Patent are hereby corrected as shown below:

Column 1, lines 20 to 27, the left-hand portion of the formula should appear as shown below:

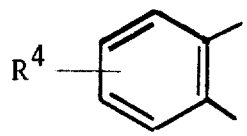

Column 7, line 47, "5-(1-chlorocyclohexyl)" should read -- 5-1′-chlorocyclohexyl) --.

Signed and sealed this 23rd day of May 1972.

(SEAL)
Attest:

EDWARD M. FLETCHER, JR.          ROBERT GOTTSCHALK
Attesting Officer                Commissioner of Patents